(12) United States Patent
Naeem

(10) Patent No.: US 6,197,267 B1
(45) Date of Patent: *Mar. 6, 2001

(54) CATALYTIC REACTOR

(75) Inventor: Munir-ud-Din Naeem, Poughkeepsie, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/900,405

(22) Filed: Jul. 25, 1997

(51) Int. Cl.[7] ................. F01N 3/28; F01N 3/10
(52) U.S. Cl. .......... 422/174; 422/177; 422/180; 422/199; 502/439; 502/502.12; 502/502.13; 502/502.15
(58) Field of Search ................ 422/174, 199, 422/168, 177, 186, 186.04, 906, 907; 204/164, 176; 60/275, 282; 96/54; 427/454–456; 502/527.12, 527.13, 527.14, 527.15, 439

(56) References Cited

U.S. PATENT DOCUMENTS

| | | | |
|---|---|---|---|
| 3,598,635 | 8/1971 | Sagona | 427/455 |
| 3,928,533 | 12/1975 | Beall et al. | 423/213.2 |
| 3,930,890 | 1/1976 | Dietz | 422/211 |
| 3,966,646 | 6/1976 | Noakes et al. | 502/439 |
| 3,979,193 | 9/1976 | Sikich | 96/54 |
| 4,094,652 * | 6/1978 | Lowther | 96/143 |
| 4,149,998 | 4/1979 | Tauster et al. | 502/439 |
| 4,159,353 | 6/1979 | Adelsberg et al. | 427/454 |
| 4,465,576 | 8/1984 | Negishi et al. | 204/192.35 |
| 4,557,796 | 12/1985 | Druschke et al. | 204/192.35 |
| 4,703,028 | 10/1987 | Steininger | 502/178 |
| 4,711,009 * | 12/1987 | Cornelison et al. | 422/180 |
| 4,780,277 | 10/1988 | Tanaka et al. | 422/4 |
| 4,804,796 | 2/1989 | Wang et al. | 585/269 |
| 4,910,180 | 3/1990 | Berndt et al. | 502/304 |
| 4,976,929 * | 12/1990 | Cornelison et al. | 422/174 |
| 4,992,407 | 2/1991 | Chakraborty et al. | 502/327 |
| 5,114,901 | 5/1992 | Tsang et al. | 502/240 |
| 5,234,882 | 8/1993 | Pfefferle | 502/314 |
| 5,236,672 | 8/1993 | Nunez et al. | 422/186.04 |
| 5,248,564 | 9/1993 | Ramesh | 428/688 |
| 5,313,089 | 5/1994 | Jones, Jr. | 257/295 |
| 5,316,738 * | 5/1994 | Kojima et al. | 422/180 |
| 5,371,056 | 12/1994 | Leyrer et al. | 502/66 |
| 5,407,880 | 4/1995 | Ikeda et al. | 502/67 |
| 5,441,706 * | 8/1995 | Whittenberger | 422/174 |
| 5,490,973 | 2/1996 | Grothaus et al. | 422/186.04 |
| 5,496,788 | 3/1996 | Domesle et al. | 502/333 |
| 5,512,251 | 4/1996 | Brunson et al. | 422/174 |
| 5,525,570 | 6/1996 | Chakraborty et al. | 502/326 |
| 5,525,834 | 6/1996 | Fischer et al. | 257/691 |
| 5,604,174 | 2/1997 | Friedman et al. | 502/439 |
| 5,609,736 * | 3/1997 | Yamamoto | 204/164 |

(List continued on next page.)

Primary Examiner—Hien Tran
(74) Attorney, Agent, or Firm—Daryle K. Neff

(57) ABSTRACT

A reactor for corona destruction of volatile organic compounds (VOCs), a multi-surface catalyst for the reactor and a method of making the catalyst for the reactor. The reactor has a catalyst of a high dielectric material with an enhanced surface area. A catalyst layer stack is formed by depositing a high dielectric layer on a substrate and, then depositing a conductive layer on the dielectric layer. The catalyst layer stack is bombarded by low RF energy ions to form an enhanced surface area and to form a protective layer over the conductive layer. Catalyst layer stacks may be joined back to form double-sided catalyst layer stacks. The catalyst layer stack may be diced into small pieces that are used in the reactor or the whole catalyst layer stack may be used.

13 Claims, 4 Drawing Sheets

U.S. PATENT DOCUMENTS

| | | | |
|---|---|---|---|
| 5,632,961 | 5/1997 | Sheller | 422/180 |
| 5,696,394 | 12/1997 | Jones, Jr. et al. | 257/295 |
| 5,721,043 | 2/1998 | Summerfelt et al. | 428/210 |
| 5,721,188 | 2/1998 | Sung et al. | 502/439 |
| 5,736,422 * | 4/1998 | Lee et al. | 437/201 |
| 5,756,223 | 5/1998 | Cameron et al. | 428/688 |
| 5,776,621 | 7/1998 | Nashimoto | 428/688 |
| 5,786,097 | 7/1998 | Scanlan | 428/469 |
| 5,804,323 | 9/1998 | McKee et al. | 428/700 |
| 5,837,405 | 11/1998 | Tomofuji et al. | 430/5 |
| 5,849,669 | 12/1998 | Wen | 505/190 |
| 5,851,948 | 12/1998 | Chuang et al. | 502/314 |
| 5,866,238 | 2/1999 | Takayama et al. | 428/209 |
| 5,880,508 | 3/1999 | Wu | 257/411 |
| 5,914,015 | 6/1999 | Barlow et al. | 204/177 |

* cited by examiner

CATALYTIC REACTOR

RELATED APPLICATION DATA

This application is related to the following applications which are assigned to the same owner and filed on even date herewith: "Dielectric Catalyst Structures," U.S. patent application Ser. No. 08/900,404 and "Method of Making Dielectric Catalyst Structures," U.S. patent application Ser. No. 08/900,406.

BACKGROUND OF THE INVENTION

1. Field of the Invention

The present invention relates to catalytic reactors and, more particularly, to catalytic reactors utilizing high electric fields and/or corona discharge.

2. Background Description

Corona destruction of volatile organic compounds (VOCs) is a method of disposing of noxious or toxic gases or other atmospheric contaminants or pollutants. The unwanted gas is decomposed into a less polluting gas that may be vented into the atmosphere. The unwanted gases, generally VOC, are passed over a bed of catalyst in a reactor, while a high alternating current (AC) voltage is passed across the bed to produce a corona discharge. A dielectric material catalyst in the reactor produces a stable corona and the VOCs are converted to $CO_2$ gas.

Typically, prior art reactors are large and expensive. Further these large reactors require, typically, at least 10 kilovolts (kV) to generate the corona.

Thus, there is a need for cheaper, smaller, more compact reactors that are effective at lower voltage.

In addition to decomposing VOCs, catalytic reactors are used with high electric fields or corona discharge to facilitate a variety of chemical reactions.

PURPOSES OF THE INVENTION

It is a purpose of the invention to reduce the size of a catalytic reactor which utilizes corona discharge.

It is another purpose of the present invention to provide a simple, cost efficient way to construct a catalytic reactor which utilizes a corona discharge.

It is yet another purpose of the present invention to reduce the voltage required to produce corona discharge in a reactor.

SUMMARY OF THE INVENTION

Accordingly, a catalytic reactor is provided according to the present invention. According to a first embodiment of the invention, the reactor includes a plurality of catalyst pieces which form a catalyst bed through which a gaseous mixture including unwanted gases are driven. According to a second embodiment of the invention, the reactor contains a plurality of catalyst plates or wafers arranged to interact with the flow of pollutant gases within the reactor. Preferably, in the second embodiment of the reactor, the catalyst plates or wafers are arranged to cause the pollutant gases to flow in a maze-like path through the reactor.

Catalyst pieces are cut from plates or wafers including a substrate of nonconducting or semiconducting material such as glass, a ceramic material, aluminum oxide, other stable oxides of metal, silicon, germanium, silicon-germanium, or gallium arsenide etc. Over the substrate is placed a layer of material having a high dielectric constant, such as lead zirconium titanate (PZT), barium titanate ($BaTiO_3$) or strontium titanate ($SrTiO_3$), etc., which material effectively lowers the voltage required to operate the reactor. Over the high dielectric material a conducting film is placed. Preferably, a protective nonconductive coating is placed over the conducting film.

Preferably, the conducting film is rough surface conditioned to enhance the surface area of the catalyst material in contact with the gases. Preferably, the conducting film is conditioned by low energy bombardment of oxygen and argon ions to form a rough surface thin oxide layer over the conducting film.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
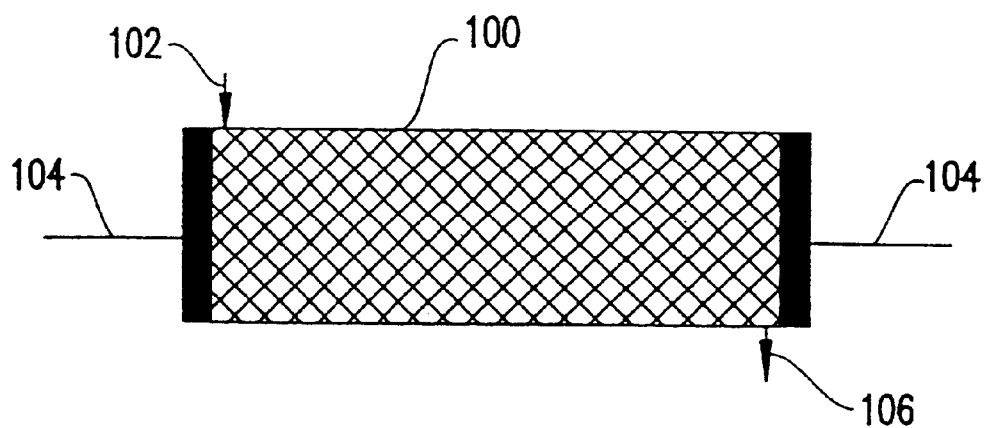
FIG. 1 is a schematic representation of a first preferred embodiment of the present invention.

A preferred embodiment of the present invention is a catalytic reactor, preferably a multi-surface reactor for corona destruction of volatile organic compounds (VOCs). In a first preferred embodiment, as represented schematically in FIG. 1, the reactor includes a vessel 100 filled with catalyst coated substrate pieces (as represented by the cross-hatching). Preferably, vessel 100 is cylindrical. Noxious or polluting gas enters reactor vessel 100 through an inlet 102. Alternating current (AC) is applied to reactor 100 at electrodes 104 to generate a corona therein. Preferable, electrodes 104 are located at opposite ends of the cylindrical reactor vessel 100. A gaseous mixture of unwanted gases such as volatile organic compounds, e.g. hydrocarbons, chlorinated hydrocarbons and desirable gases, e.g. air, enters reactor vessel 100 filters through the catalyst coated substrate pieces, exiting through outlet 106. Gas in the reactor is exposed to the corona in the presence of the catalyst as it filters through the reactor 100. The resulting decontaminated gas and reaction byproducts exit through the outlet 106.

Figure 2:
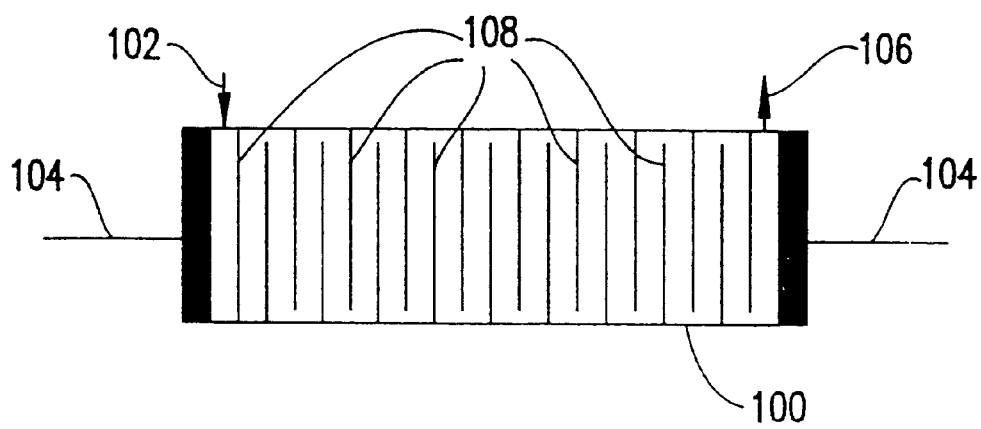
FIG. 2 is a schematic representation of a second preferred embodiment of the present invention.

FIG. 2 schematically represents a second embodiment wherein, reactor vessel 100 includes catalyst coated substrate plates or wafers 108 arranged in parallel with a space between adjacent parallel plates 108. The catalyst coated plates 108 of the second embodiment are of identical material and construction as the catalyst coated pieces of the first embodiment. In this embodiment, noxious or polluting gas enters reactor 100 through an inlet 102 and passes between parallel plates 108, along a maze-like path formed by the arrangement of plates until the resultant gas exits at outlet 106. The gas is exposed to the corona as it passes through the reactor 100.

Figure 3A:
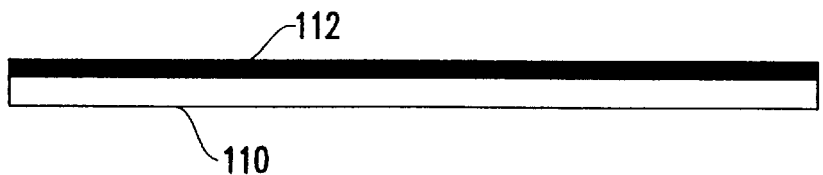
FIG. 3A–C represent the steps in forming catalyst coated substrates according to a preferred embodiment of the present invention.
Figure 3B:
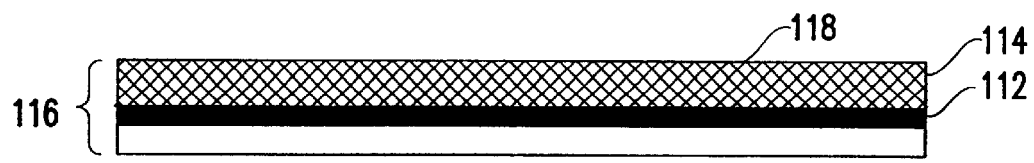
Figure 3C:
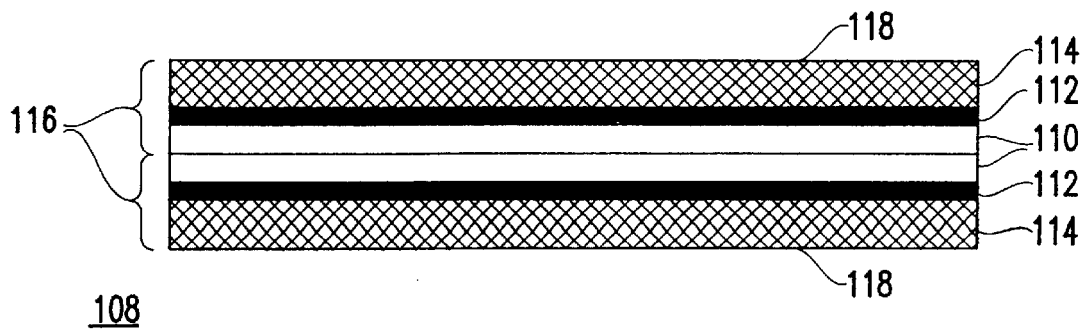

FIG. 3A–C represent the steps in forming the catalyst coated plates or wafers 108. Plates or wafers 108 include a substrate having at least an outer layer of semiconductor or nonsemiconductor material, which material is typically and preferably silicon (Si). First, in FIG. 3A, a high dielectric (κ) material is deposited on a substrate plate or wafer 110. The substrate plate or wafer may be a waste substrate or wafer having been processed through one, several, or all steps for fabricating electronic devices or integrated circuits, so long as the substrate is not composed entirely of conductor material and has esssentially a semiconductive or nonconductive outer surface.

Preferably, dielectric film 112 is sputter deposited in an $O_2$/Ar atmosphere (50/50 by volume) by radio frequency (RF) or DC magnetron sputtering from a titanate target, preferably a titanate of barium (Ba) or Strontium (Sr) such as $BaTiO_3$ or $SrTiO_3$. Alternatively, a target of lead zirconium titanate (PZT) or a zeolite material may be used for deposition of dielectric film 112. Dielectric film 112 is 1–500 nanometer (nm) thick, typically 200–300 nm and preferably 250 nm in thickness.

Alternatively, film 112 may be formed by electron beam evaporation or chemical vapor deposition (CVD) or wet chemical deposition.

Next, in FIG. 3B, a conducting film 114 is formed on the high dielectric film 112 to form a film stack 116. Preferably, conducting film 114 is a layer including copper (Cu), of thickness between 5–500 nm, typically 20–100 nm, and preferably 50 nm. Alternatively, any suitable metal such as gold (Au), aluminum (Al), Titanium (Ti), Tungsten (W), nickel (Ni), palladium (Pd) or platinum (Pt) may be substituted for copper. Conducting film 114 may be formed by any suitable method such as sputtering, CVD, electroplating or electron beam (e-beam) evaporation.

Next, the film stack 116 is bombarded with oxygen ions using low energy radio frequency RF to form a rough surface oxide film on the surface 118 of conducting film 114, thereby increasing the area of surface 118. The thin oxide film thus formed protects the conducting film 114 from corrosion while increasing the surface area of the catalyst in contact with the gaseous mixtures. Surface area enhancement and metal oxide formation is performed in an $O_2$/Ar mixture between 0.2 to 1 by volume, preferably 0.5. Alternatively, an appropriate inert or non-reactive gas may be substituted for Ar. The $O_2$/Ar mixture total flow rate is between 50 to 300 standard cubic centimeters per minute (sccm), typically 50 to 250 sccm and, preferably, 100 sccm. Pressure is maintained between 100 to 500 mT, typically 200–400 mT and, preferably, 300 mT.

The plate or wafer is mounted on a chuck with Helium (He) backside cooling to maintain the film temperature below 300° C. Helium pressure is maintained between 4 and 30 torr, typically, 4 to 14 torr and, preferably, 9 torr. The chamber wall and cathode temperatures are maintained between 5 to 60° C., with typical wall temperature between 16–50° C., preferably at 36.5° C. and with typical cathode temperature 8–20° C., preferably at 16.2° C. RF power between 300 to 1400 W, typically 500–900 W and, preferably, 700 W is applied to bombard the target with ion energy below 500 eV for 10 to 70 seconds, typically between 40–60 seconds and preferably, 50 seconds using up to a 90 Gauss magnetic field, typically 40–70 Gauss and, preferably 60 Gauss.

Finally, in FIG. 3C, two identical film stacks 116 are joined back to back, forming a catalyst coated plate or wafer 108. Alternatively, two plates of different construction according to the embodiments disclosed herein may be joined back to back. The plate or wafer may be used in constructing a reactor according to a second preferred embodiment (FIG. 2) or, cut into relatively small pieces for use in a reactor constructed according to a first preferred embodiment (FIG. 1).

Figure 4:
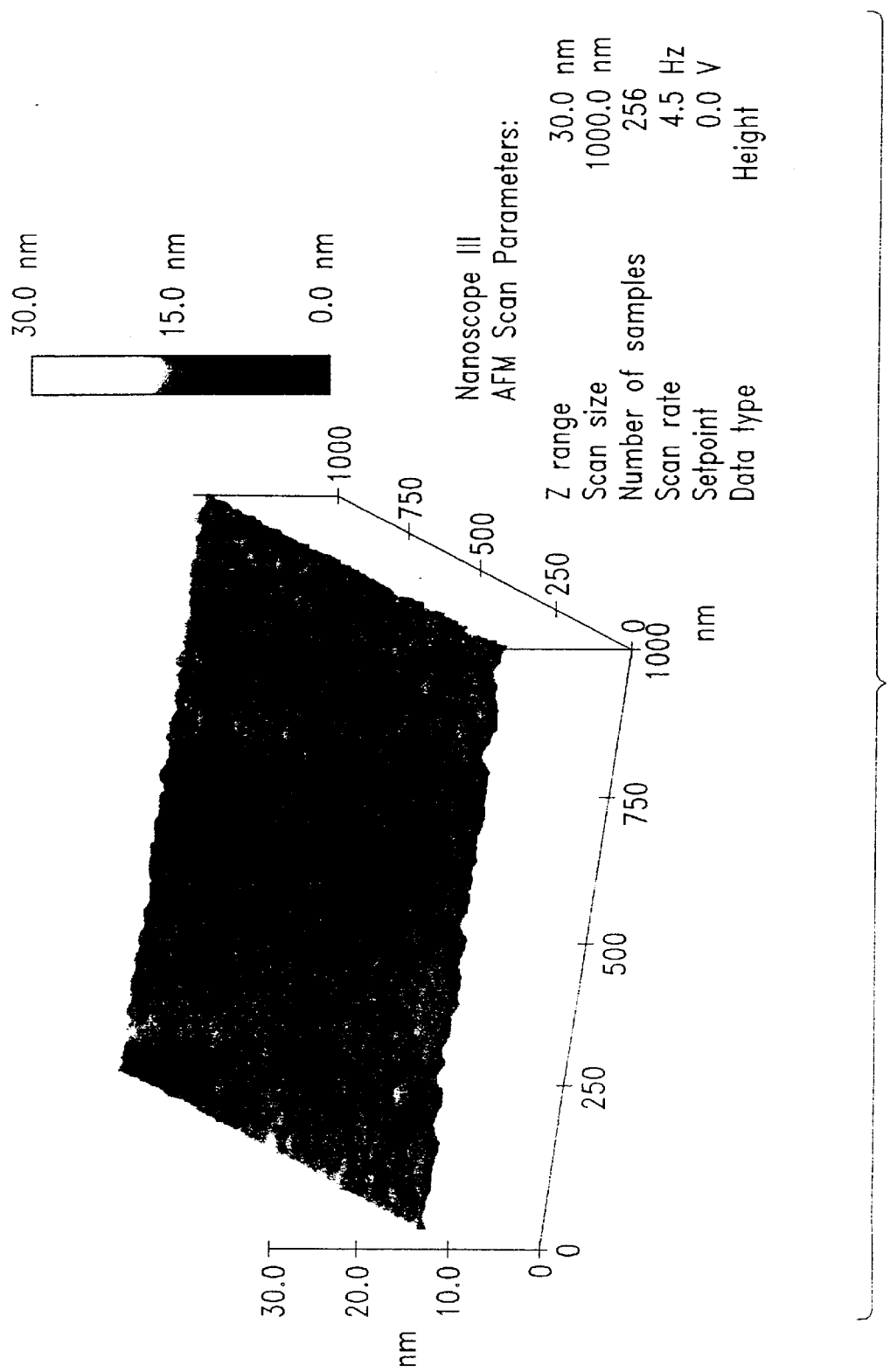
FIG. 4 is a reproduction of an atomic force microscopy image of conducting film 114 formed without ion bombardment.
Figure 5:
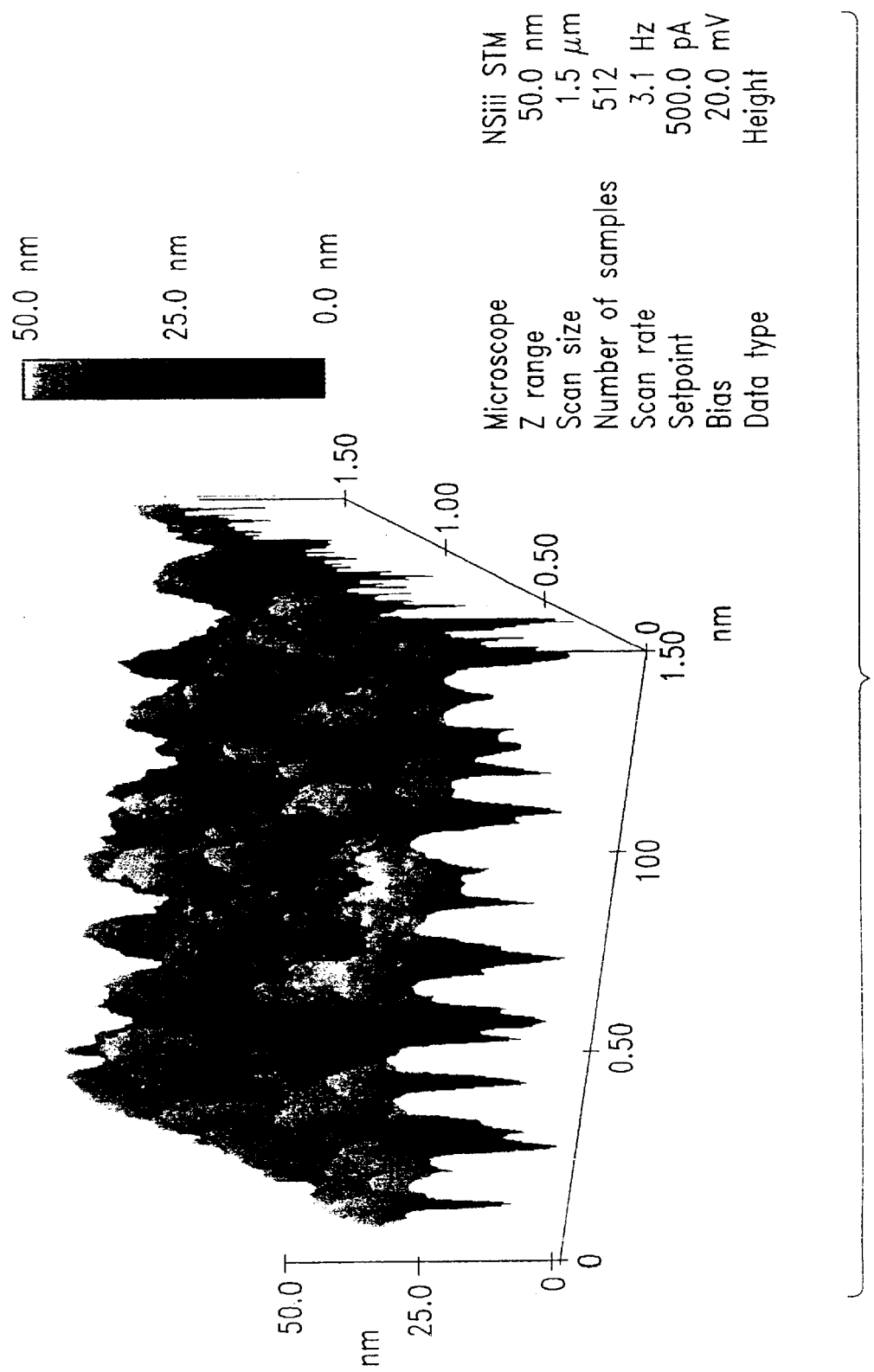
FIG. 5 is a reproduction of an atomic force microscopy image of conducting film 114 after ion bombardment according to the preferred embodiment of the present invention.

FIG. 4 is a reproduction of an atomic force microscopy image of conducting film 114 prior to surface area enhancement using ion bombardment, at which time the surface 118 is fairly smooth. FIG. 5 is a reproduction of an atomic force microscopy image of conducting film 114 after ion bombardment performed according to the preferred embodiment of the present invention. As will be recognized, the surface area of surface 118 shown in FIG. 5 exhibits considerable surface area enhancement over the smoother surface 118 shown in FIG. 4.

While the invention has been described with reference to certain preferred embodiments thereof, those skilled in the art will recognize that many modifications of the invention can be practiced within the spirit and scope of the appended claims.

I claim:

1. A catalytic reactor comprising:
   a vessel having an inlet and an outlet, said inlet admitting a first gaseous mixture including a first compound into said vessel and said outlet passing a second gaseous mixture including reaction products of said first compound out from said vessel;
   a pair of electrodes disposed on opposing interior surfaces of said vessel;
   a layered catalyst disposed within said vessel, said layered catalyst containing a substrate, a layer of dielectric material disposed on a first surface of said substrate, a conducting layer disposed over said dielectric material layer, and a protective coating disposed over said conducting layer, said protective coating including an oxide of a metal included in said conducting layer.

2. The reactor of claim 1 wherein said protective coating forms a rough, enhanced area surface for contact with said gaseous mixtures.

3. The reactor of claim 2 wherein said conducting layer consists essentially of metal.

4. The reactor of claim 3 wherein said conducting metal layer consists of copper.

5. The reactor of claim 3 wherein said conducting layer consists essentially of one or more metals selected from the group consisting of copper, gold, aluminum, titanium, tungsten, nickel, palladium, and platinum.

6. The reactor of claim 1 wherein said layered catalyst is disposed within said vessel in a plurality of randomly oriented pieces.

7. The reactor of claim 1 wherein said layered catalyst is disposed within said vessel in a plurality of plates oriented in the flow of said gaseous mixture therein.

8. The catalytic reactor of claim 1 wherein said conducting layer is formed by at least one selected from the group consisting of sputtering, chemical vapor deposition, electroplating, or electron beam evaporation.

9. The catalytic reactor of claim 1 wherein said protective coating is formed by interaction of said conducting layer with a supply of oxygen atoms to said conducting layer.

10. The catalytic reactor of claim 1 wherein said protective coating is formed by low energy radio frequency bombardment of oxygen atoms to said conducting layer.

11. A corona discharge reactor adapted to decompose a volatile organic compound (VOC), comprising:

a vessel having an inlet and an outlet, said inlet admitting a first gaseous mixture including said VOC into said vessel and an outlet passing a second gaseous mixture including reaction products of said VOC out from said vessel;

a pair of electrodes disposed on opposing interior surfaces of said vessel;

a layered catalyst disposed within said vessel, said layered catalyst containing a substantially planar substrate, said substrate having at least an outer layer consisting of one or more materials selected from the group consisting of semiconductors and nonconductors, said catalyst further including first and second dielectric layers consisting essentially of material having a high dielectric constant disposed on opposite sides of said substrate, first and second conducting layers consisting essentially of metal formed on said respective first and second dielectric layers, and first and second oxide layers formed on said respective first and second conducting layers, said respective conducting layers and said oxide layers forming rough, enhanced area surfaces for contact with said gaseous mixtures, said dielectric constant being sufficiently high and said first and second conducting layers being sufficiently conductive such that a corona discharge is produced within said reactor when a voltage is applied across said electrodes.

12. The reactor of claim 11 wherein said layered catalyst is disposed within said vessel in a plurality of randomly oriented pieces.

13. The reactor of claim 11 wherein said layered catalyst is disposed within said vessel in a plurality of plates oriented in the flow of said gaseous mixtures therein.

* * * * *